US011206701B2

(12) United States Patent
Walia et al.

(10) Patent No.: US 11,206,701 B2
(45) Date of Patent: Dec. 21, 2021

(54) METHODS AND APPARATUS TO ACCESS SERVICES OF MULTIPLE WIRELESS NETWORKS BY A SINGLE-RADIO, MULTI-SIM WIRELESS DEVICE

(71) Applicant: Apple Inc., Cupertino, CA (US)

(72) Inventors: Abhishek Walia, Cupertino, CA (US); Najeeb M. Abdulrahiman, Fremont, CA (US); Oleg M. Moskalenko, Ben Lomond, CA (US); Sergey Sitnikov, San Jose, CA (US); Vikram Bhaskara Yerrabommanahalli, Saratoga, CA (US); Ajoy K. Singh, Milpitas, CA (US); Arun G. Mathias, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/889,732

(22) Filed: Jun. 1, 2020

(65) Prior Publication Data

US 2020/0383152 A1  Dec. 3, 2020

Related U.S. Application Data

(60) Provisional application No. 62/856,098, filed on Jun. 2, 2019.

(51) Int. Cl.
*H04W 76/12* (2018.01)
*H04W 88/06* (2009.01)
(Continued)

(52) U.S. Cl.
CPC .......... *H04W 76/12* (2018.02); *H04W 60/00* (2013.01); *H04W 84/12* (2013.01); *H04W 88/06* (2013.01); *H04W 88/16* (2013.01)

(58) Field of Classification Search
CPC ..... H04W 76/27; H04W 60/00; H04W 48/18; H04W 88/06; H04W 36/14; H04W 76/30;
(Continued)

(56) References Cited

U.S. PATENT DOCUMENTS

| 8,750,931 B2 | 6/2014 | Park et al. |
| 2015/0094071 A1 | 4/2015 | Hang et al. |

(Continued)

OTHER PUBLICATIONS

European Patent Application No. 20177045.0—Extended European Search Report dated Oct. 14, 2020.
(Continued)

*Primary Examiner* — Daniel Lai
(74) *Attorney, Agent, or Firm* — Dickinson Wright RLLP

(57) ABSTRACT

Apparatus and methods to support access to services of multiple wireless networks by a single-radio, multiple subscriber identity module (SIM)/electronic SIM (eSIM) wireless device are disclosed. To send or receive voice communications for multiple SIMs/eSIMs, when an active voice connection for a first SIM/eSIM uses wireless circuitry to connect to a first cellular wireless network via a first radio access network, the single-radio, multi-SIM/eSIM wireless device uses alternative data transports, such as via a wireless local area network (WLAN) or by tunneling through the first radio access network of the first cellular wireless network to connect to services of additional cellular wireless networks associated with the multiple SIMs/eSIMs.

20 Claims, 7 Drawing Sheets

(51) Int. Cl.
*H04W 60/00* (2009.01)
*H04W 84/12* (2009.01)
*H04W 88/16* (2009.01)

(58) Field of Classification Search
CPC ..... H04W 60/06; H04W 76/10; H04W 76/25; H04W 76/12; H04W 36/0022; H04W 76/18; H04W 8/18; H04W 72/02; H04W 88/02; H04W 8/20; H04W 60/005; H04W 76/19; H04W 76/22; H04W 76/32; H04W 84/12; H04W 24/02; H04W 4/16; H04W 76/00; H04W 88/10; H04W 8/10; H04W 8/183; H04W 36/0011; H04W 76/20; H04W 24/04; H04W 36/0027; H04W 36/0033; H04W 36/0066; H04W 88/16; H04W 76/15; H04W 76/16

See application file for complete search history.

(56) References Cited

U.S. PATENT DOCUMENTS

| | | | |
|---|---|---|---|
| 2016/0360450 A1* | 12/2016 | Yang | H04W 76/34 |
| 2017/0118255 A1 | 4/2017 | Tsai et al. | |
| 2018/0110081 A1* | 4/2018 | Serna | H04L 65/1006 |
| 2018/0368099 A1* | 12/2018 | Chen | H04W 48/18 |
| 2019/0098487 A1 | 3/2019 | Boettger | |
| 2020/0205044 A1* | 6/2020 | Lin | H04L 65/1016 |
| 2021/0068018 A1* | 3/2021 | Kim | H04W 12/06 |

OTHER PUBLICATIONS

Korean Patent Application No. 10-2020-0066210—Notice of Preliminary Rejection dated Mar. 12, 2021.

* cited by examiner

METHODS AND APPARATUS TO ACCESS SERVICES OF MULTIPLE WIRELESS NETWORKS BY A SINGLE-RADIO, MULTI-SIM WIRELESS DEVICE

CROSS-REFERENCE TO RELATED APPLICATIONS

The present application claims the benefit of U.S. Provisional Application No. 62/856,098, entitled "METHODS AND APPARATUS TO ACCESS SERVICES OF MULTIPLE WIRELESS NETWORKS BY A SINGLE-RADIO, MULTI-SIM WIRELESS DEVICE," filed Jun. 2, 2019, the content of which is incorporated herein by reference in its entirety for all purposes.

FIELD

The described embodiments generally relate to wireless communications, and more particularly, to methods and apparatus to support access to services of multiple wireless networks by a single-radio, multiple subscriber identity module (SIM) wireless device, where services of different wireless networks are associated with different SIMs in the single-radio, multi-SIM wireless device. Access may be based on registration with Internet Protocol Multimedia Subsystem (IMS) servers.

BACKGROUND

Newer generation, e.g., fourth generation (4G) and fifth generation (5G), cellular wireless networks employing newer radio access technology that implements one or more $3^{rd}$ Generation Partnership Project (3GPP) Long Term Evolution (LTE) and LTE Advanced (LTE-A) standards are rapidly being developed and deployed by network operators worldwide. The newer cellular wireless networks provide a range of packet-based services for both voice and data in parallel. A user of a wireless device can access services offered by a wireless network service provider, also referred to as a mobile network operator (MNO), based on service subscriptions controlled by authentication credentials included in a profile, also referred to as a subscriber identity module (SIM), when included in a removable universal integrated circuit card (UICC), or as an electronic SIM (eSIM), when included in an embedded UICC (eUICC) of the wireless device. With a removable UICC and an unlocked wireless device, a user can access different services by replacing the UICC/SIM combination. With a configurable eUICC, eSIMs can be downloaded to the eUICC for access to different wireless services. Wireless devices that accommodate multiple UICCs/SIMs and/or multiple eSIMs on an eUICC provide for multiple subscriber identities to be used by the same wireless device to access different services, including services that can span different cellular wireless networks that use different cellular radio access technologies (RATs). Single-radio wireless devices can include configurable wireless circuitry to connect with different cellular wireless networks at different times but restrict or disallow simultaneous connections that use different cellular access network RATs in parallel. There exists a need for mechanisms to allow a user to access services in parallel using multiple different SIM/eSIM profiles at the same time with minimal hardware and/or software complexity.

SUMMARY

Apparatus and methods to support access to services of multiple wireless networks by a single-radio, multiple subscriber identity module (SIM) wireless device are disclosed. The services for different wireless networks are associated with different subscriber identity modules (SIMs) and/or electronic SIMs (eSIMs) in the wireless device. The wireless device includes a first SIM/eSIM that provides for access to wireless services of a first wireless service provider via a first cellular wireless network that includes a first radio access network using a first radio access technology and a first core network. The wireless device also includes a second SIM/eSIM that provides for access to wireless services of a second wireless service provider via a second cellular wireless network that includes a second radio access network using a second radio access technology and a second core network. In some embodiments, the wireless device includes multiple SIMs/eSIMs that provide for access to wireless services of multiple wireless service providers. The wireless device is a single-radio wireless device that includes wireless circuitry that supports an active voice connection via a single radio access network of a cellular wireless network at a time and does not support two or more active voice connections via two or more different radio access networks of two or more cellular wireless networks at the same time. To send or receive voice communications for multiple SIMs/eSIMs, when an active voice connection for a first SIM/eSIM uses the wireless circuitry to connect to a first cellular wireless network via a first radio access network, the single-radio wireless device uses alternative data transports, such as via a wireless local area network (WLAN) or by tunneling through a cellular data connection via the first radio access network of the first cellular wireless network to connect to additional cellular wireless networks.

The single-radio wireless device can be registered with multiple cellular wireless networks at the same time, such as via multiple Internet Protocol Multimedia Subsystem (IMS) servers. In some embodiments, one of the multiple SIMs/eSIMs of the single-radio wireless device can be selected as a data preferred SIM/eSIM and used preferentially for cellular data connections. When the single-radio wireless device establishes a mobile-originated (MO) or mobile-terminated (MT) voice connection using the data-preferred SIM/eSIM, the single-radio wireless device can move existing IMS registrations (or establish new IMS registrations) for each non-data-preferred SIM/eSIM to use a data transport connection to reach the core wireless network associated with the non-data preferred SIM/eSIM. A data transport connection can traverse a WLAN or can tunnel through an internet protocol (IP) cellular data connection of the data-preferred SIM. In some embodiments, when a WLAN data connection is available (or can be established), the WLAN data connection can be preferred for the non-data-preferred SIMs/eSIMs rather than tunneling through the IP cellular data connection of the data-preferred SIM. In some embodiments, when a WLAN data connection is not available (or cannot be established), the tunneling option via the IP cellular data connection of the data-preferred SIM can be used. When the single-radio wireless device terminates the MO/MT voice connection, the single-radio wireless device can move the IMS registrations for each non-data-preferred SIM/eSIM to traverse the radio access networks of their associated cellular wireless networks.

When the single-radio wireless device establishes a mobile-originated (MO) or mobile-terminated (MT) voice connection using a non-data-preferred SIM/eSIM, an existing IMS registration for the data preferred SIM/eSIM, as well as for other non-data-preferred SIMs/eSIMs, can be changed to use a data transport connection (if not already using one) to reach their respective associated core wireless networks. The data transport connection can be via a WLAN data connection when available. When a WLAN data connection is not available (or cannot be established), the single-radio wireless device, responsive to establishment of the MO/MT voice connection using the non-data-preferred SIM/eSIM, can establish a temporary IP cellular data connection using the non-data-preferred SIM/eSIM and can move the IMS registrations for the data-preferred SIM/eSIM (and for other non-data-preferred SIMs/eSIMs) to tunnel to their respective cellular wireless networks via the temporary IP cellular data connection. When the single-radio wireless device terminates the MO/MT voice connection, the single-radio wireless device can move the IMS registrations for the data-preferred SIM/eSIM and for each of the other non-data-preferred SIMs/eSIMs to traverse the radio access networks of their associated cellular wireless networks.

By using data connections, when an active voice connection exists for one of the SIMs/eSIMs for a first cellular wireless network, the single-radio, multi-SIM/eSIM wireless device is able to access voice services, including features such as short message service (SMS) messages and visual voice mail, for other SIMs/eSIMs associated with other cellular wireless networks. When WLAN data connections are not available, the single-radio wireless device can establish tunneled connections to evolved Packet Data Gateways (ePDGs) of the other cellular wireless networks via an Internet PDN gateway of the first cellular wireless network. The single-radio wireless device can register for wireless services with IP Multimedia Subsystem (IMS) servers via the tunneled connections connected with the ePDGs of the other cellular wireless networks. The single-radio wireless device can access wireless services managed by the core networks of the other cellular wireless networks through the tunneled data connections that traverse the radio access network of the first cellular wireless network. The wireless device can originate and receive voice calls and short message service (SMS) messages from the core networks of the other cellular wireless networks using the tunneled data connections through the first cellular wireless network.

Data connections can also be used by the single-radio multi-SIM/eSIM wireless device for SIMs/eSIMs that are out of coverage area for their respective radio access networks, e.g., when out-of-service (OOS). IMS registration for the OOS SIMs/eSIMs can be accomplished through a WLAN data connection or via an IPSec tunnel over a cellular IP data connection through an in-service SIM/eSIM. The single-radio multi-SIM/eSIM wireless device can select a data transport from a set of available data transports based on a set of criteria, such as based on a radio access technology (RAT) type, a reference signal received power (RSRP), a reference signal received quality (RSRQ), an amount of data available in a cellular data plan, or a combination thereof. The single-radio multi-SIM/eSIM wireless device can monitor the criteria factors and switch between data transports based on the monitored criteria. When a new data transport is established, the single-radio multi-SIM/eSIM wireless device can moves existing tunneled connections to use the new data transport or establish new tunneled connections for any OOS SIMs/eSIMs.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Figure 1:
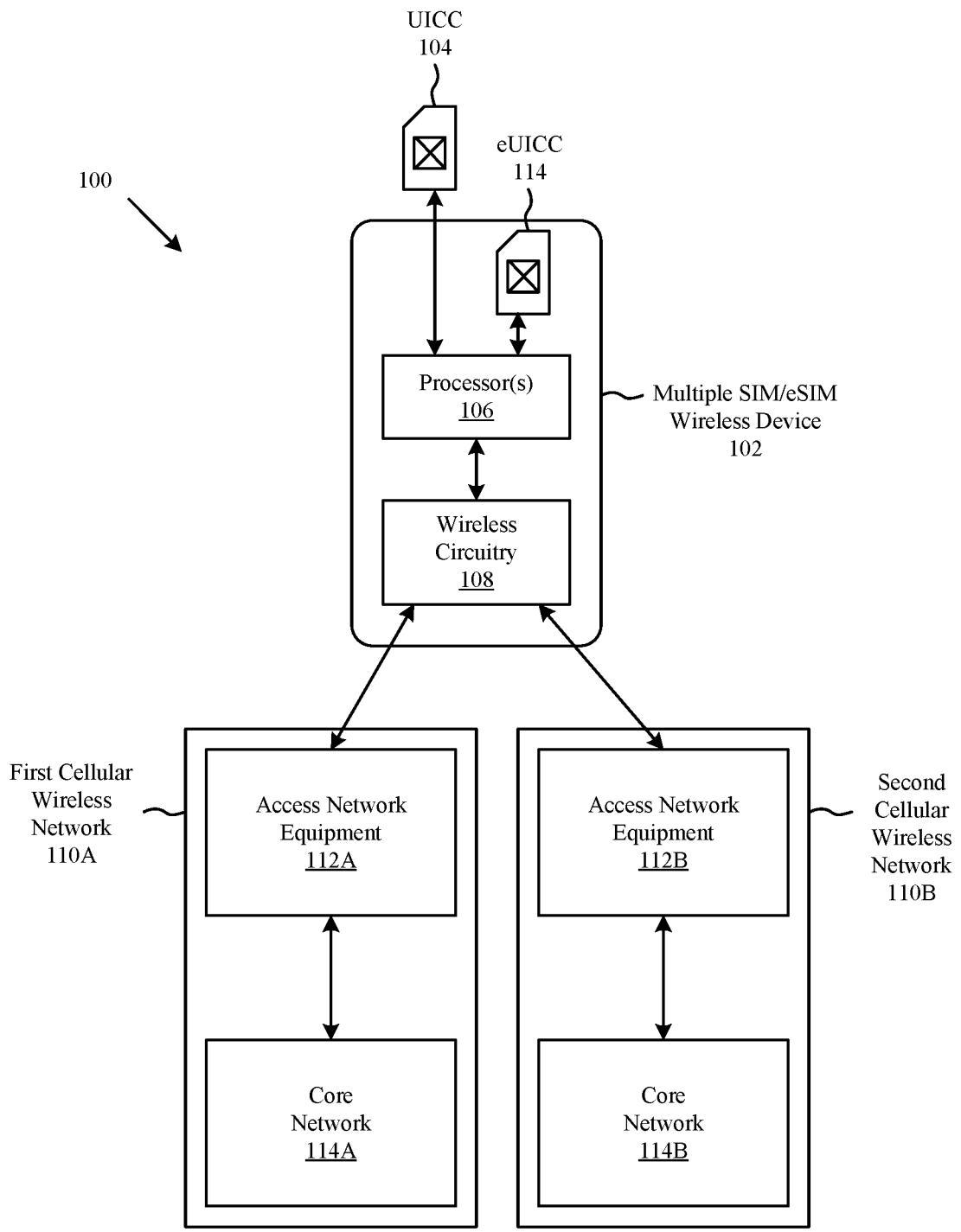
FIG. 1 illustrates an example of a multiple subscriber identity module (SIM)/electronic SIM (eSIM) wireless device communicating with two wireless networks, in accordance with some embodiments.

Representative examples for accessing wireless services using multiple subscriber identity modules (SIMs) and/or electronic SIMs (eSIMs) are provided herein. These examples are provided to add context to, and to aid in the understanding of, the subject matter of this disclosure. It should be apparent that the present disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure.

References are made in this section to the accompanying drawings, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

Users of wireless devices can seek to access services provided by different cellular wireless network service providers through different cellular wireless networks. A user can obtain and use a variety of UICCs, also referred to as SIM cards, and/or install multiple electronic SIMs (eSIMs) on an eUICC of the wireless device, where the SIMs/eSIMs provide access to services for different service providers. Use of multiple SIMs/eSIMs allows for flexibility and convenience to access a broader variety of services by the wireless device. A user can seek to access services provided by multiple SIMs/eSIMs without having to use a wireless device that can connect to multiple associated radio access networks of the cellular wireless networks associated with the multiple SIMs/eSIMs at the same time. For example, the user can seek to access services provided by a SIM/eSIM without having to access the radio access network (RAN) of the cellular wireless network used by the wireless network provider associated with the SIM/eSIM. Instead, the wireless device can register with an IP Multimedia Subsystem (IMS) server in the core network of the cellular wireless network managed by the wireless network provider associated with the SIM/eSIM. The wireless device can use a data transport connection to access services of the second SIM/eSIM. The data transport connection can be through a WLAN or via an IP cellular data connection that traverses the radio access network of another SIM/eSIM of the wireless device.

In some embodiments, one or more of the SIMs/eSIMs of the wireless device support mobile originated (MO) and mobile terminated (MT) voice connections over a non-cellular wireless network, such as through an 802.11 wireless local area network (WLAN), which can also be referred to as Wi-Fi calling, voice over Wi-Fi (VoWiFi), or voice over WLAN (VoWLAN). In some embodiments, one or more of the SIMs/eSIMs support communication of MO SMS and MT SMS via a non-cellular wireless network connection, such as over a Wi-Fi connection. In some embodiments, cellular wireless networks associated with the one or more SIMs/eSIMs include IMS servers, with which the wireless device can register for services, and evolved Packet Data Network Gateways (ePDGs) through which services can be accessed via an Internet Protocol (IP) cellular data (or non-cellular data) connection. In some embodiments, the wireless device accesses services associated with a SIM/eSIM through an IP cellular data connection established using another SIM/eSIM, e.g., by establishing a tunneled (IPSec) cellular data connection through a packet data network (PDN) gateway of the wireless service provider associated with a first SIM/eSIM across an IP network to an evolved PDN gateway (ePDG) of a core network of a wireless service provider associated a second SIM/eSIM. The wireless device can register for access to services, e.g., voice connections and/or SMS, with an IP Multimedia Subsystem (IMS) server of a core network of a wireless service provider associated with the second SIM over the tunneled IP cellular data connection. The wireless device, once registered with the IMS server of the core network associated with the second SIM/eSIM can originate and receive voice connections and text messaging (SMS) using the cellular IP data connection that traverses the radio access network (RAN) of the wireless network associated with the first SIM/eSIM. The cellular IP data connection via the RAN of the wireless network of the first SIM/eSIM is sufficient to send and receive data packets, which can include data packets used for voice connections, such as for voice over IP (VoIP), Facetime® audio, or similar packet voice connections for one or more other SIMs/eSIMs of the wireless device.

To send or receive voice communications for a second SIM/eSIM, when an active voice connection for a first SIM/eSIM uses the wireless circuitry of the single-radio, multi-SIM/eSIM wireless device to connect to a first cellular wireless network via a first radio access network, the single-radio, multi-SIM/eSIM wireless device uses alternative data transports, such as via a wireless local area network (WLAN) or by tunneling through the first radio access network of the first cellular wireless network to connect to additional cellular wireless networks. The single-radio, multi-SIM/eSIM wireless device can be registered with multiple cellular wireless networks at the same time, such as via one or more IMS servers. In some embodiments, one of the multiple SIMs/eSIMs of the single-radio wireless device can be selected as a preferred SIM/eSIM for data connections. When the single-radio, multi-SIM/eSIM wireless device establishes a mobile-originated (MO) or mobile-terminated (MT) voice connection using the data-preferred SIM/eSIM, the single-radio wireless device moves existing IMS registrations for each non-data-preferred SIM/eSIM to use a data transport connection to reach the core wireless network associated with the non-data preferred SIM/eSIM. A data transport connection can traverse a WLAN or can tunnel through an IP cellular data connection of the data-preferred SIM. In some embodiments, when a WLAN data connection is available (or can be established), the WLAN data connection can be preferred for the non-data-preferred SIMs/eSIMs rather than tunneling through the IP cellular data connection of the data-preferred SIM. In some embodiments, when a WLAN data connection is not available (or cannot be established), the tunneling option can be used. When the single-radio, multi-SIM/eSIM wireless device terminates the MO/MT voice connection associated with the data-preferred SIM, the single-radio, multi-SIM/eSIM wireless device moves the IMS registrations for each non-data-preferred SIM/eSIM to traverse the radio access networks of their associated cellular wireless networks.

When the single-radio, multi-SIM/eSIM wireless device establishes a mobile-originated (MO) or mobile-terminated (MT) voice connection using a non-data-preferred SIM/eSIM, an existing IMS registration for the data preferred SIM/eSIM, as well as for all other non-data-preferred SIMs/eSIMs, can be changed to use a data transport connection (if not already using one) to reach their respective associated core wireless networks. The data transport connection can be via a WLAN when available. When a WLAN data connection is not available (or cannot be established), the single-radio, multi-SIM/eSIM wireless device, responsive to establishing the MO/MT voice connection using the non-data-preferred SIM/eSIM, can establish a temporary data connection using the non-data-preferred SIM/eSIM and can move the IMS registrations for the data-preferred SIM/eSIM (and for other non-data-preferred SIMs/eSIMs) to tunnel to their respective cellular wireless networks via the temporary IP cellular data connection. When the single-radio wireless device terminates the MO/MT voice connection, the single-radio wireless device can move the IMS registrations for the data-preferred SIM/eSIM and for each of the other non-data-preferred SIMs/eSIMs to traverse the radio access networks of their associated cellular wireless networks.

By using WLAN or IP cellular data connections, when an active voice connection exists for one of the SIMs/eSIMs for a first cellular wireless network, the single-radio, multi-SIM/eSIM wireless device is able to access voice services, including features such as short message service (SMS) messages and visual voice mail, for other SIMs/eSIMs associated with other cellular wireless networks. When WLAN data connections are not available, the single-radio wireless device can establish tunneled connections to evolved Packet Data Gateways (ePDGs) of the other cellular wireless networks via an Internet PDN gateway of the first cellular wireless network. The single-radio wireless device can register for wireless services with IP Multimedia Subsystem (IMS) servers via the tunneled connections connected with the ePDG of the other cellular wireless networks. The single-radio, multi-SIM/eSIM wireless device can access wireless services managed by the core networks of the other cellular wireless networks through the tunneled IP cellular data connections that traverse the radio access network of the first cellular wireless network. The wireless device can originate and receive voice calls and short message service (SMS) messages from the core networks of the other cellular wireless networks using the tunneled IP cellular data connections through the first cellular wireless network.

Data connections can also be used by the single-radio multi-SIM/eSIM wireless device for any SIMs/eSIMs that are out of coverage area for their respective radio access networks, e.g., when out-of-service (OOS). IMS registration for the OOS SIMs/eSIMs can be accomplished through a WLAN data connection or via a tunnel over a cellular IP data connection using an in-service SIM/eSIM. The wireless device can select a data transport from a set of available data transports based on a set of criteria, such as based on a radio access technology (RAT) type, a reference signal received power (RSRP), a reference signal received quality (RSRQ), an amount of data available in a cellular data plan, or a combination thereof. The wireless device can monitor the criteria factors and switch between data transports based on the monitored criteria. When a new data transport is established, the wireless device can move existing tunneled connections to use the new data transport or establish new tunneled connections for any OOS SIMs/eSIMs.

The solution described herein provide greater power efficiency in a single radio, multiple SIM/eSIM wireless device than a multiple SIM, multiple active (MSMA) wireless device that uses multiple parallel cellular wireless radios.

FIG. 1 illustrates a diagram 100 of components of a multi-SIM/eSIM wireless device 102 including one or more processor(s) 106 and wireless circuitry 108 that provides for wireless radio frequency (RF) connections between the multi-SIM/eSIM wireless device 102 and a first cellular wireless network 110A and a second cellular wireless network 110B. In some embodiments, the wireless circuitry 108 includes one or more baseband processor(s), and a set of RF analog front-end circuitry. In some embodiments, the wireless circuitry 108 and/or a portion thereof can include or be referred to as a wireless transmitter/receiver or a transceiver or a radio. The terms circuit, circuitry, component, and component block may be used interchangeably herein, in some embodiments, to refer to one or more operational units of a wireless device that process and/or operate on digital signals, analog signals, or digital data units used for wireless communication. For example, representative circuits can perform various functions that convert digital data units to transmitted radio frequency analog waveforms and/or convert received analog waveforms into digital data units including intermediate analog forms and intermediate digital forms. The wireless circuitry 108 can include components of RF analog front-end circuitry, e.g. a set of one or more antennas, which can be interconnected with additional supporting RF circuitry that can include filters and other analog components that can be "configured" for transmission and/or reception of analog signals via one or more corresponding antennas to one of the first and second cellular wireless networks 110A/B.

Notably, the multi-SIM/eSIM wireless device 102 can include hardware restrictions that limit the multi-SIM/eSIM wireless device 102 to connect to only one of the first and second cellular wireless networks 110A/110B via their respective access network equipment 112A/112B at a time. When the multi-SIM/eSIM wireless device 102 has an active connection via the access network equipment 112A of the first cellular wireless network 110A, the multi-SIM/eSIM wireless device 102 can be precluded from establishing another active connection via the access network equipment 112B of the second cellular wireless network 110B. Instead, as described further herein, the multi-SIM/eSIM wireless device 102 can use a data transport connection to establish a tunneled IP cellular data connection through the first cellular wireless network 110A to access services of the second cellular wireless network 110B.

The processor(s) 106 and the wireless circuitry 108 can be configured to perform and/or control performance of one or more functionalities of the multi-SIM/eSIM wireless device 102, in accordance with various implementations. The processor(s) 106 and the wireless circuitry 108 can provide functionality for coordinating hardware/software resources in the multi-SIM/eSIM wireless device 102 to provide for connections to the first and second cellular wireless networks 110A/B. The processor(s) 106 may include multiple processors of different types that can provide for both wireless communication management and/or higher layer functions, e.g., one or more of the processor(s) 106 may be configured to perform data processing, application execution, and/or other device functions according to one or more embodiments of the disclosure. The multi-SIM/eSIM wireless device 102, or portions or components thereof, such as processor(s) 106, can include one or more chipsets, which can respectively include any number of coupled microchips thereon.

In some embodiments, the processor(s) 106 may be configured in a variety of different forms. For example, the processor(s) 106 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 106 of the multi-SIM/eSIM wireless device 102 can be coupled to and/or configured in operative communication with each other, and these components may be collectively configured to perform mobility management functions associated with multiple subscriber identities associated with wireless services provided via multiple wireless networks. In some implementations, the processor(s) 106 can be configured to execute instructions that may be stored in memory, or that can otherwise be accessible to the processor(s) 106 in some other device memory. As such, whether configured as, or in conjunction with, hardware or a combination of hardware and software, the processor(s) 106 may be capable of performing operations according to various implementations described herein, when configured accordingly. In various embodiments, memory in the multi-SIM/eSIM wireless device 102 may include multiple memory devices that can be associated with any common volatile or non-volatile memory type. In some scenarios, the memory may be associated with a non-transitory computer-readable storage medium that can store various computer program instructions, which may be executed by the processor(s) 106 during normal program executions. In this regard, the memory can be configured to store information, data, applications, instructions, or the like, for enabling the wireless device to carry out various functions in accordance with one or more embodiments of the disclosure. In some implementations, the memory may be in communication with, and/or otherwise coupled to, the processor(s) 106, as well as one or more system buses for passing information between and amongst the different device components of the multi-SIM/eSIM wireless device 102.

The multi-SIM/eSIM wireless device 102 illustrated in FIG. 1 includes a removable UICC 104 and an embedded UICC (eUICC) 114. The UICC 104 can include at least one subscriber identity module (SIM), which can be embodied as a software/firmware program installed on the UICC 104, while the eUICC 114 can include at least one electronic SIM (eSIM), which can also be embodied as a software/firmware program installed on the UICC 104. A removable UICC 104 can provide a user of the multi-SIM/eSIM wireless device 102 the ability to replace a UICC to change services. Hardware complexity and/or a size of a wireless device can limit the ability to include multiple UICC slots, and thus additional arrangements for wireless devices are illustrated further herein in FIG. 2B to include multiple SIMs on a single UICC and/or electronic SIMs (eSIMs) on an embedded UICC or combinations thereof.

The multi-SIM/eSIM wireless device 102 can register with multiple wireless networks, e.g., the first and second cellular wireless networks 110A/B, simultaneously. The wireless circuitry 108 of the multi-SIM/eSIM wireless device 102 can be configured to register with and/or establish a connection with the first cellular wireless network 110A via access network equipment 112A, which interfaces with a core network 114A. The wireless circuitry 108 of the multi-SIM/eSIM wireless device 102 can also be configured to register with and/or establish a connection with the second cellular wireless network 110B via access network equipment 112B, which interfaces with a core network 114B. The wireless circuitry 108 of the multi-SIM/eSIM wireless device 102 can support transmission and reception to only one of the first and second wireless networks 110A/B, via their respective access network equipment 112A/B at a time. As the multi-SIM/eSIM wireless device 102 can register with two different wireless networks simultaneously via two different subscriptions, the multi-SIM/eSIM wireless device 102 can appear as two distinct devices (each associated with a different number, user, and/or subscription). A multi-SIM/eSIM wireless device 102 that can connect to only one wireless network at a time but can monitor and/or receive communication from multiple wireless networks with which it is registered can be referred to as a Multiple SIM, Multiple Standby (MSMS) wireless device. A multi-SIM/eSIM wireless device that can connect to multiple wireless networks through their respective radio access networks simultaneously using different subscriber identities can be referred to as a "Multiple SIM, Multiple Active" (MSMA) wireless device. While the multi-SIM/eSIM wireless device 102 may only connect via one radio access network of one cellular wireless network at a time, some wireless devices can also provide for connections via a cellular wireless network and via a non-cellular wireless network simultaneously as further discussed herein with respect to FIG. 2A.

It should be appreciated that not all of the components, device elements, and hardware illustrated in and described with respect to the multi-SIM/eSIM wireless device 102 of FIG. 1 may be essential to this disclosure, and thus, some of these items may be omitted, consolidated, or otherwise modified within reason. Additionally, in some implementations, the subject matter associated with the multi-SIM/eSIM wireless device 102 can be configured to include additional or substitute components, device elements, or hardware, beyond those depicted within the illustrations of FIG. 1.

Figure 2A:
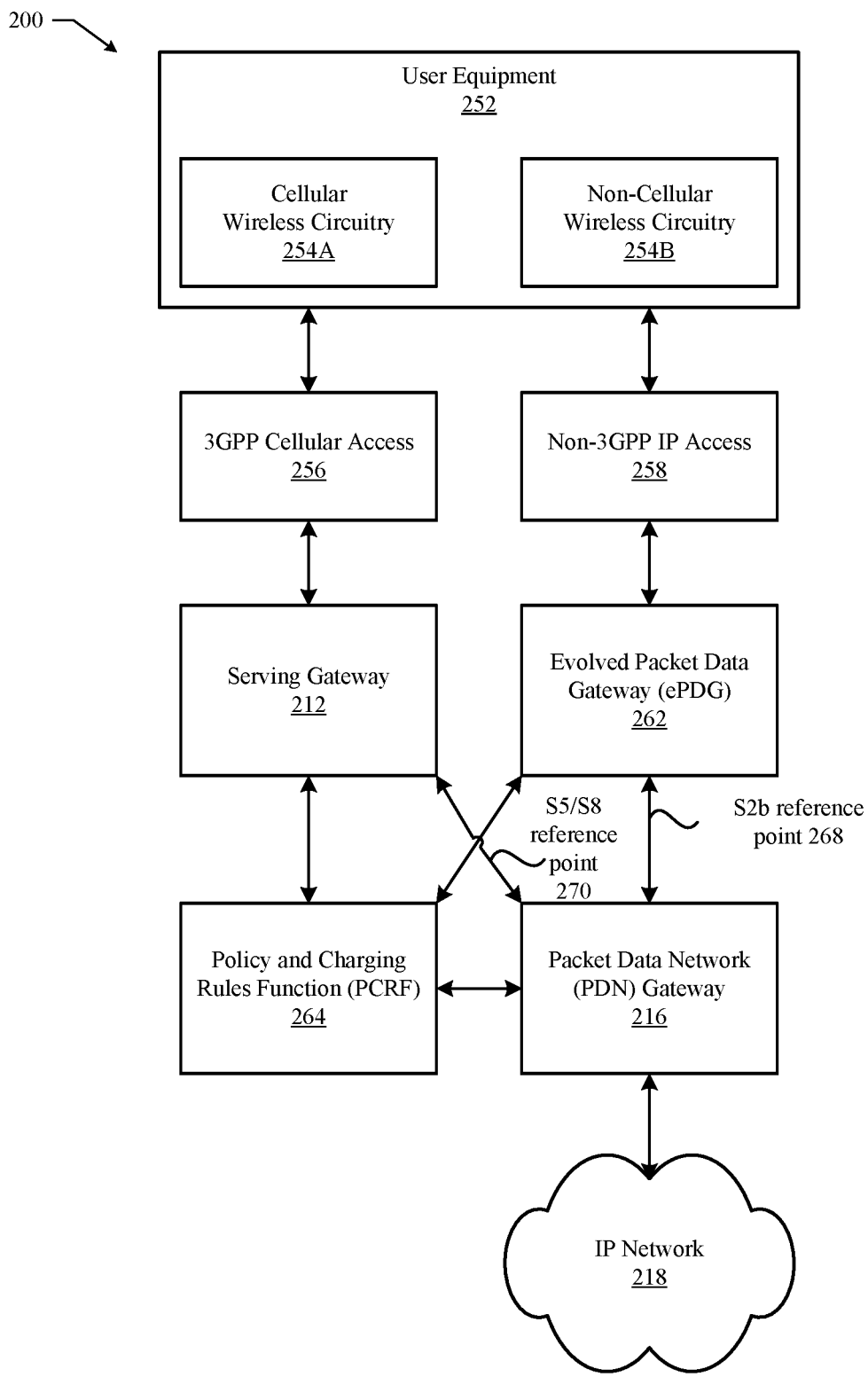
FIG. 2A illustrates an example set of network elements of cellular wireless networks, in accordance with some embodiments.

FIG. 2A illustrates a wireless system 200 that includes a user equipment (UE) 252 communicatively coupled to an Internet Protocol (IP) network 218 through both a $3^{rd}$ generation partnership project (3GPP) cellular access 256 using cellular wireless circuitry 254A and a non-3GPP IP-based wireless access 258 using non-cellular wireless circuitry 254B. In some embodiments, the 3GPP cellular access 256 includes an evolved universal terrestrial access network (E-UTRAN) or other network elements of an LTE/LTE-A wireless network. In some embodiments, the non-3GPP IP access 258 includes a wireless local area network (WLAN) or portions thereof, e.g., a wireless access point, and thus the non-3GPP IP access 258 can also be referred to as a WLAN access. The UE 252 can be configured to connect to a packet data network (PDN) through the 3GPP cellular access 256 or the non-3GPP IP-based wireless access 258 independently or together via both the 3GPP cellular access 256 and the non-3GPP IP-based wireless access 258. The 3GPP cellular access 256 connects to a serving gateway (GW) 212, which connects to a packet data network (PDN) gateway 216 through an S5 reference point 270 for home network users or via an S8 reference point 270 for roaming network users. The PDN gateway 216 provides a connection to the IP network 218 through which a variety of services can be accessed. The non-3GPP IP access 258 connects to an evolved packet data gateway (ePDG) 262, which connects to the PDN gateway 216 through an S2b reference point 268 for an untrusted non-3GPP IP access 258 or through an S2a reference point (not shown) for a trusted non-3GPP IP access (not shown). Each of the serving gateway 212, the ePDG 262, and the PDN gateway 216 are also connected to a policy and charging rules function (PCRF) 264. In some embodiments, the ePDG 262 communicates requests from the PDN gateway 216 to the UE 252 and communicates responses from the UE 252 to the PDN gateway 216 to support communication with the IP network 218.

The 3GPP S2b reference point 268 between the ePDG 262 and the PDN gateway 216 provides a mechanism to allow the UE 252, when attached via an untrusted non-3GPP IP access network (e.g., non-3GPP IP access 258), to connect securely via a 3GPP evolved packet system (EPS) network to the IP network 218 and to access IP services via the secure connection. In some embodiments, the UE 252 can establish a secure connection, e.g., an Encapsulating Security Payload (ESP) tunnel based on an IP Security (IPsec) protocol, using an Internet Key Exchange Version 2 (IKEv2) protocol signaling exchange between the UE 252 and the ePDG 262, which in turn can establish a secure tunnel, e.g., a Proxy Mobile IPv6 (PMIP) or GPRS Tunneling Protocol (GTP) tunnel, to the PDN gateway 216 when a session for the UE 252 is anchored.

Figure 2B:
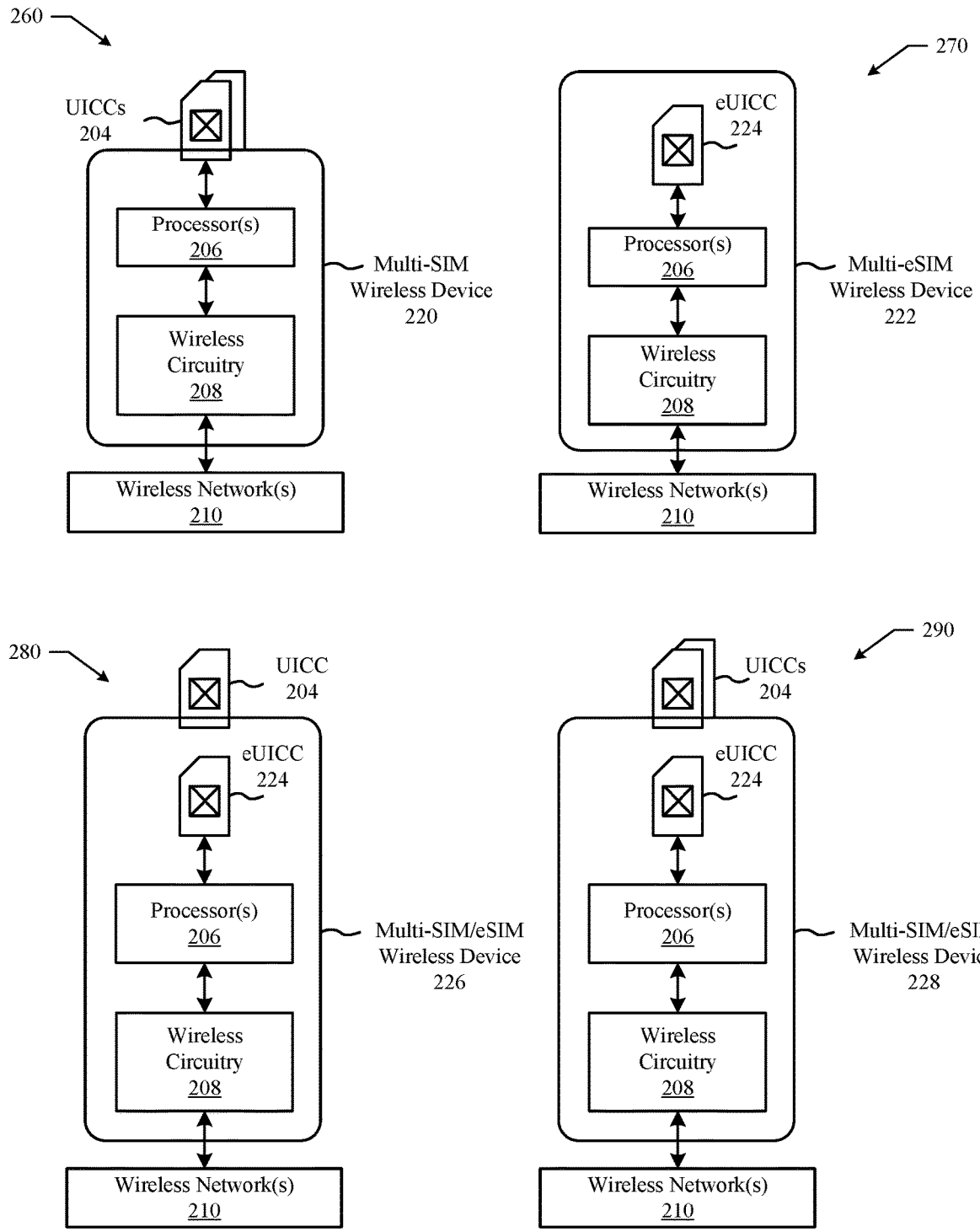
FIG. 2B illustrates examples of wireless devices that support multiple subscriber identities, in accordance with some embodiments.

FIG. 2B illustrates diagrams for additional wireless devices that support multiple subscriber identities using removable UICCs and/or embedded UICCs (eUICCs) with SIMs and/or eSIMs implemented thereon. As illustrated in diagram 260, a multi-SIM wireless device 220 includes multiple UICCs 204, which can be inserted and removed individually or together, and communicate with one or more processors 206 that connect to wireless circuitry 208 that provides for wireless communication with one or more wireless networks 210. As the physical size and design of the multi-SIM wireless device 220 can limit the number of UICCs 204 that can be supported, alternatively, as illustrated in diagram 270, a multi-eSIM wireless device 222 can include an embedded UICC (eUICC) 224 connected with the processor(s) 206 and to the wireless network(s) 210 via the wireless circuitry 208. The eUICC 224 can be built into the multi-eSIM wireless device 222 and can be not removable from the multi-eSIM wireless device 222, e.g., permanently affixed to a circuit board in the multi-eSIM wireless device 222. The eUICC 224 can be programmed such that one or more electronic SIMs (eSIMs) can be implemented on the eUICC 224. Each eSIM can be associated with a distinct subscriber identity and/or provide distinct services or subscriptions for a user of the multi-eSIM wireless device 222. Diagram 280 illustrates an exemplary multi-SIM/eSIM wireless device 226 that includes a removable UICC 204, on which can be installed one or more SIMs, and an eUICC 224 on which one or more eSIMs can be installed. The multi-SIM/eSIM wireless device 226 can represent another form of the multi-SIM/eSIM wireless device 102 of FIG. 1. The combination of SIMs on the UICC 204 and/or eSIMs on the eUICC 224 can provide for connections to one or more wireless networks 210 using the wireless circuitry 208 under the control of the processor(s) 206 of the multi-SIM/eSIM wireless device 226. Diagram 290 illustrates another multi-SIM/eSIM wireless device 228 that includes multiple UICCs 204, on which one or more SIMs can be installed, and an eUICC 224, on which one or more eSIMs can be installed. The combination of SIMs on the UICCs 204 and/or eSIMs on the eUICC 224 can provide for connections to one or more wireless networks 210 using the wireless circuitry 208 under the control of the processor(s) 206 of the multi-SIM/eSIM wireless device 228.

In general, a multi-SIM/eSIM wireless device 102 that supports multiple subscriber identities can include (i) at least one UICC 204 that supports multiple SIMs, (ii) an eUICC 224 that supports multiple eSIMs, or (iii) a combination of UICC 204 and eUICC 224. Each UICC 204 can support one or more SIMs, and each eUICC 224 can support one or more eSIMs. A multi-SIM/eSIM wireless device 102 that supports multiple subscriber identities, e.g., 102, 220, 222, 226, 228, can include a combination of SIMs and/or eSIMs to support communication with one or more wireless networks 210.

Figure 3:
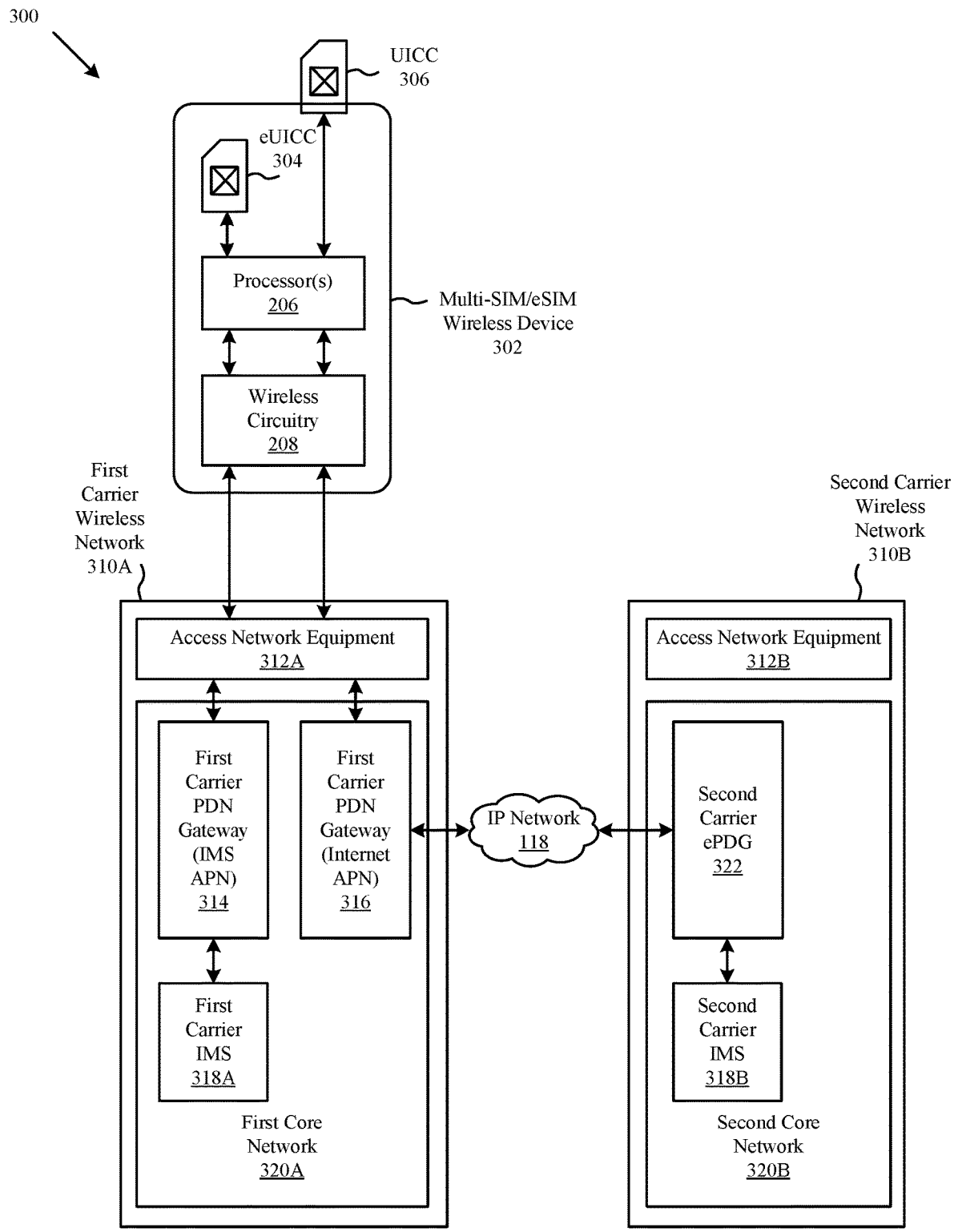
FIG. 3 illustrates an example of a wireless device using multiple subscriber identities to access services of distinct cellular wireless networks, in accordance with some embodiments.

FIG. 3 illustrates a diagram 300 of a multi-SIM/eSIM wireless device 302 that can access services for multiple subscriber identities through a radio access link to access network equipment 312A of a first carrier wireless network 310A. The multi-SIM/eSIM wireless device 302 includes an eUICC 304, on which a first eSIM is installed and provides access to services of the first carrier wireless network 310A, and a UICC 306 on which a SIM, which will be referred to as a second SIM, is installed that provides access to services of a second carrier wireless network 310B. The use of a SIM on a UICC 306 and an eSIM on an eUICC 304 is not intended to be limiting. The same principles to access multiple services described herein for the multi-SIM/eSIM wireless device 302 can apply to any form of multi-SIM/eSIM wireless device that includes multiple SIMs on multiple UICCs 306, multiple eSIMs on an eUICC 304, or a combination of SIMs/eSIMs on one or more UICCs/eUICCs. One or more processors 206 of the multi-SIM/eSIM wireless device 302 interact with wireless circuitry 208 to establish connections through the access network equipment 312A of the first carrier wireless network 310A. Initially, the multi-SIM/eSIM wireless device 302 can attach to the first carrier wireless network 310A. In some embodiments, the core network 320A of the first carrier wireless network 310A includes a first carrier IMS server 318A with which the multi-SIM/eSIM wireless device 302 registers for services of the first carrier wireless network 310A. The first carrier IMS server 318A is reachable by the multi-SIM/eSIM wireless device 302 via a first carrier PDN gateway 314, e.g., using an IMS access point name (APN) known to the one or more processors 206 of the multi-SIM/eSIM wireless device 302. The multi-SIM/eSIM wireless device 302 can establish a context for data connections, e.g., a packet data protocol (PDP) context, via the access network equipment 312A to a first carrier PDN gateway 316, e.g., using an Internet APN known to the one or more processors 206 of the multi-SIM/eSIM wireless device 302, to connect with the IP network 118. Through a data connection that traverses the access network equipment 312A of the first carrier wireless network 310A and the first carrier PDN gateway 316, the multi-SIM/eSIM wireless device 302 can reach a second carrier IMS server 318B via a second carrier ePDG 322 in the core network 320B of the second carrier wireless network 310B using a tunneled connection over the IP network 118. The multi-SIM/eSIM wireless device 302 can register for access to services of the core network 320B of the second carrier wireless network 310B and need not establish a connection with or attach to the second carrier wireless network 310B via the access network equipment 312B of the second carrier wireless network 310B. The multi-SIM/eSIM wireless device 302 can originate voice connections or text messaging and/or receive voice connections or text messaging using services of the second carrier wireless network 310B through the data connection established with the first carrier wireless network 310A via the access network equipment 312A. With the multi-SIM/eSIM wireless device 302 attached to the first carrier wireless network 310A (and therefore registered for services with the first carrier wireless network 310A) and also registered with the second carrier IMS server 318B of the second carrier wireless network 310B (via a data connection through the first carrier wireless network 310A), the multi-SIM/eSIM wireless device 302 can access services of both the first carrier wireless network 310A and the second carrier wireless network 310B simultaneously, e.g., with two different mobile numbers.

While the multi-SIM/eSIM wireless device 302 illustrated in FIG. 3 depicts a single UICC 306 and a single eUICC 304, the same methods can be applied to any combination of UICCs 306 and/or eUICCs 304 of a wireless device, such as the various wireless devices illustrated in FIG. 2B, or a single eUICC 304 or single UICC 306 wireless device that include multiple SIMs (for UICCs) or multiple eSIMs (for eUICCs) to access two different sets of services provided by two different wireless networks. For example, a single eUICC 304 device can include two different eSIMs provided by two different wireless service providers for access to two different wireless networks. One of the eSIMs can be used for access to a first wireless network including a data connection over which access to services of the second wireless network can be achieved when the core network of the second wireless network includes an IMS server for registering for service. A data connection through the first wireless network to the second wireless network allows for access to services of the second wireless network without establishing a connection through a radio access network of the second wireless network.

Voice Connections Via Different SIMs/eSIMs of a Single-Radio Multi-SIM/eSIM Wireless Device For a single-radio multi-SIM/eSIM wireless device 302, when one of the SIMs/eSIMs is being used for a voice connection, e.g., a circuit-switched voice call or a voice over LTE (VoLTE) call, through a first radio access network of a first cellular wireless network, the other SIMs/eSIMs of the single-radio multi-SIM/eSIM wireless device cannot communicate with their respective radio access networks of cellular wireless networks different from the first cellular wireless network. This inability to form simultaneous connections via two different radio access networks of two different cellular wireless networks can be due to limitations of the wireless circuitry of the single-radio MSMS wireless device. To address this limitation, the single-radio multi-SIM/eSIM wireless device can use alternative data connections by which to originate and/or receive voice connections (or other services, such as SMS messaging and visual voice mail) for the other SIMs/eSIMs not being used for the active voice connection. The alternative data connections can be over a wireless local area network (WLAN), when available, or through a data connection of the SIM/eSIM that is in use for the active voice connection. In some cases, selection of an alternative data connection for a SIM/eSIM can be based on selection criteria such as connection availability, connection power (RSRP), connection quality (RSRQ), cellular data plan limitations, service plan limitations, or the like. The single-radio multi-SIM/eSIM wireless device can move existing tunnels or connections (or establish new tunnels) to use a selected data connection. Upon establishment of an active voice connection for one SIM/eSIM, the single-radio MSMS device can establish a tunneled data connection for each of the other SIMs/eSIMs to allow for access to voice services of their respective cellular wireless networks, where the tunneled data connections traverse the radio access network of the cellular wireless network for the SIM/eSIM of the active voice connection.

Figure 4:
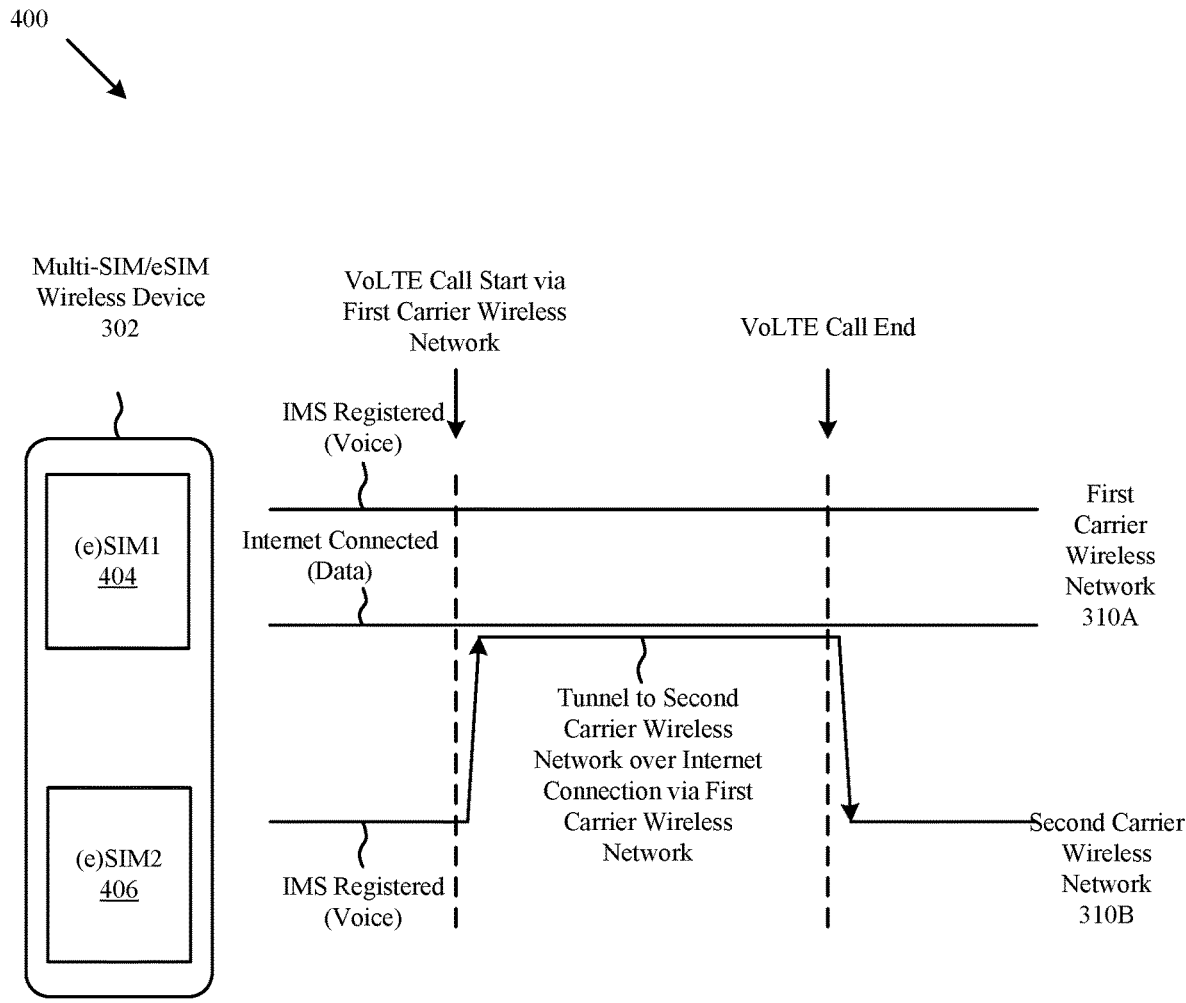
FIG. 4 illustrates a diagram of an exemplary set of actions taken by a single-radio, multi-SIM/eSIM wireless device, in accordance with some embodiments.

FIG. 4 illustrates a diagram 400 of an exemplary set of actions taken by a single-radio, multi-SIM/eSIM wireless device 302. The multi-SIM/eSIM wireless device 302 includes a first SIM/eSIM 404 (labeled as (e)SIM1), which can be selected as a data-preferred SIM/eSIM for the multi-SIM/eSIM wireless device 302. The multi-SIM/eSIM wireless device 302 also includes a second SIM/eSIM 406 (labeled as (e)SIM2), which can be selected as a non-data-preferred SIM/eSIM. The first SIM/eSIM 404 of the multi-SIM/eSIM wireless device 302 can be registered with an IMS server of the cellular wireless network associated with the first SIM/eSIM 404. Additionally, the second SIM/eSIM 406 of the multi-SIM/eSIM wireless device 302 can be registered with an IMS sever of the cellular wireless network associated with the second SIM/eSIM 406. The multi-SIM/eSIM wireless device 302 can also have established an IP cellular data connection (or at least a context for IP network data connections) using the first SIM/eSIM 404 (which is the data-preferred SIM/eSIM). Upon establishment of an active voice connection with the first carrier wireless network 310A using the data-preferred, first SIM/eSIM 404, the multi-SIM/eSIM wireless device 302 can use the existing (or establish a new) IP cellular data connection through the first carrier wireless network 310A (associated with the first SIM/eSIM 404) to access services of the second carrier wireless network 310B for the second SIM/eSIM 406. The multi-SIM/eSIM wireless device 302 can establish an IPSec tunnel with the second carrier ePDG 322 of the second carrier wireless network 310B and perform an IMS Session Initiation Protocol (SIP) registration for the second SIM/eSIM 406 through the tunneled connection. When the active voice connection for the data-preferred first SIM/eSIM 404 terminates, the multi-SIM/eSIM wireless device 302 can return to using an IMS SIP registration directly via the second carrier wireless network 310B.

While FIG. 4 illustrates a scenario with two SIMs/eSIMs, the same ideas can be applied to multiple SIMs/eSIMs. Responsive to establishment of a voice connection for a data-preferred SIM/eSIM 404 with a first carrier wireless network 310A, access to carrier wireless networks for other non-data-preferred SIMs/eSIMs can be moved to an IP cellular data connection via the data preferred SIM/eSIM 404 (as only one radio access network can be connected to the multi-SIM/eSIM wireless device 302 at a time). The multi-SIM/eSIM wireless device 302 can use IKEv2 Mobile and Multihoming Protocol (MOBIKE) to change the transport of any existing tunneled connections to a tunneled IP cellular data connection via the first carrier wireless network 310A of the first (data-preferred) SIM/eSIM 404. For an existing VoLTE connection (other than the newly established voice connection for the data-preferred SIM/eSIM 404), when handover from VoLTE to Voice over IP Cellular Data is possible a handover can be performed (where the data transport will be the IP cellular data connection of the data-preferred first SIM/eSIM 404). The multi-SIM/eSIM wireless device 302 can perform an IMS SIP registration for the non-data-preferred SIMs/eSIMs via an IPSec tunneled connection through the IP cellular data connection of the first carrier wireless network 310A to their respective carrier wireless network's ePDGs.

Figure 5:
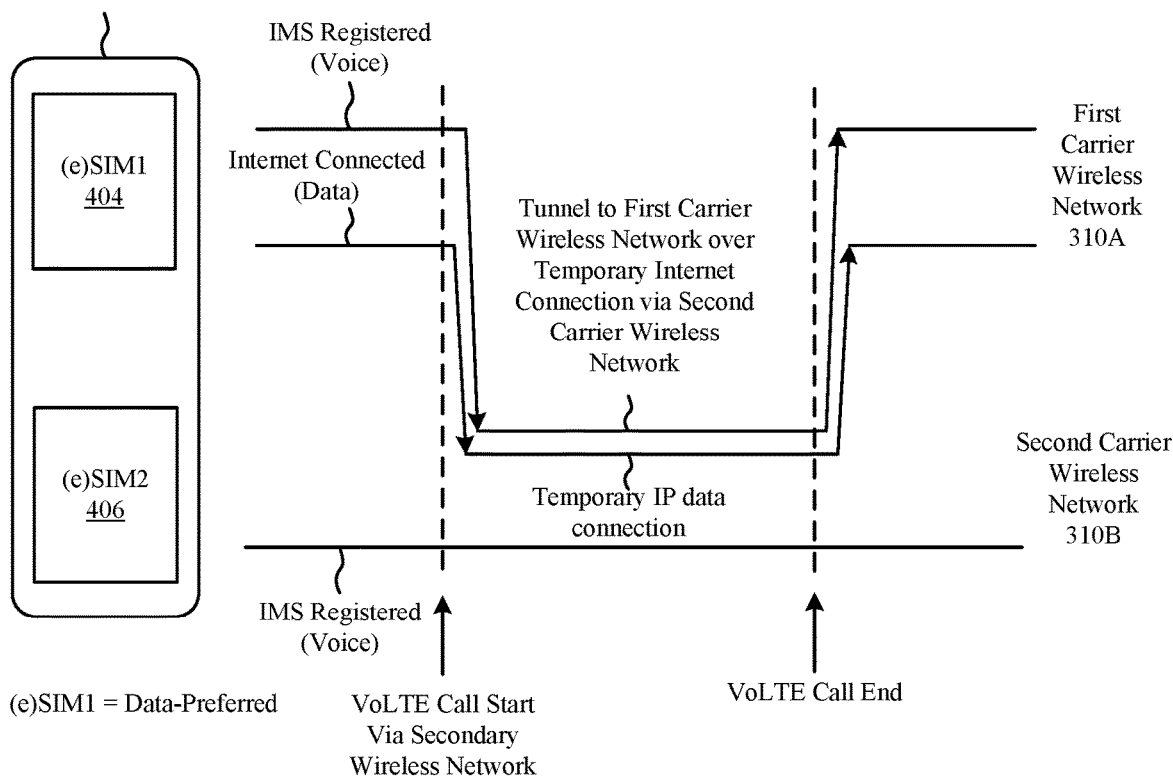
FIG. 5 illustrates a diagram of another exemplary set of actions taken by a single-radio, multi-SIM/eSIM wireless device, in accordance with some embodiments.

FIG. 5 illustrates a diagram 500 of another exemplary set of actions taken by a single-radio, multi-SIM/eSIM wireless device 302. The multi-SIM/eSIM wireless device 302 includes a first SIM/eSIM 404 (labeled as (e)SIM1), which can be selected as a data-preferred SIM/eSIM for the multi-SIM/eSIM wireless device 302. The multi-SIM/eSIM wireless device 302 also includes a second SIM/eSIM 406 (labeled as (e)SIM2), which can be selected as a non-data-preferred SIM/eSIM. The first SIM/eSIM 404 of the multi-SIM/eSIM wireless device 302 can be registered with an IMS server of the cellular wireless network associated with the first SIM/eSIM 404. Additionally, the second SIM/eSIM 406 of the multi-SIM/eSIM wireless device 302 can be registered with an IMS sever of the cellular wireless network associated with the second SIM/eSIM 406. The multi-SIM/eSIM wireless device 302 can also have an existing IP data connection (or at least a context for IP network data connections) using the first SIM/eSIM 404 (which is the data-preferred SIM/eSIM). Upon establishment of an active voice connection with the second carrier wireless network 310B using the second SIM/eSIM 406 (which is the non-data-preferred SIM/eSIM), the multi-SIM/eSIM wireless device 302 can temporarily make the second SIM/eSIM 406 the SIM/eSIM used for data connections for the multi-SIM/eSIM wireless device 302 and establish an IP cellular data connection using the second SIM/eSIM 406. While the voice connection is active via the second carrier wireless network 310B associated with the second SIM/eSIM 406, the multi-SIM/eSIM wireless device 302 can transport data using an IP cellular data connection for the second SIM/eSIM 406. The multi-SIM/eSIM wireless device 302 can use the newly established IP cellular data connection through the second carrier wireless network 310B (associated with the second SIM/eSIM 406) to access services of the first carrier wireless network 310A for the first SIM/eSIM 404. Upon termination of the active voice connection with the second carrier wireless network 310B, and when no other inactive voice connections (e.g., for a voice call on hold) are using the IP cellular data connection, the data connection for the multi-SIM/eSIM wireless device 302 can be moved back from the non-data-preferred SIM/eSIM 406 to the data-preferred SIM/eSIM 404.

As the temporary IP cellular data connection of the non-data-preferred SIM/eSIM 406 can support voice over IP (VoIP) cellular data connections for SIMs/eSIMs other than the non-data-preferred SIM/eSIM 406 (in parallel with the active voice connection with the second carrier wireless network 310B through the radio access network of the second carrier wireless network 310B), when the active voice connection with the second carrier wireless network 310B terminates, there may exist ongoing VoIP cellular data connections for other SIMs/eSIMs using the temporary IP cellular data connection. One of the other SIMs/eSIMs, which can include the (non-temporary) data-preferred SIM/eSIM 404, can be selected to support data connections for the multi-SIM/eSIM wireless device 302. In some embodiments, selection of one of the other SIMs/eSIMs to support data can be based on minimizing disruption to existing VoIP cellular data connections. In some embodiments, the selection of a particular SIM/eSIM can be based on whether handover of an existing VoIP cellular data connection can be handed over to a VoLTE connection for the particular SIM/eSIM. In some embodiments, the selection of a particular SIM/eSIM can be based on the number of existing VoIP connections that are in use for each SIM/eSIM. For example, a SIM/eSIM that has the largest number of existing VoIP connections can be selected to reduce the transfer of existing VoIP connections to the selected SIM/eSIM. For a selected SIM/eSIM, any existing VoIP connections that already use the selected SIM/eSIM can be handed over to a VoLTE connection using the selected SIM/eSIM to provide higher quality of service (QoS).

While FIG. 5 illustrates a scenario with two SIMs/eSIMs, the same ideas can be applied to multiple SIMs/eSIMs. Responsive to establishment of a voice connection for a non-data-preferred SIM/eSIM 406 with a second carrier wireless network 310B, access to carrier wireless networks for the data-preferred SIM/eSIM 404 and for other non-data-preferred SIMs/eSIMs of the multi-SIM/eSIM wireless device 302 can be moved to an IP cellular data connection via the non-data-preferred SIM/eSIM 406 (as only one radio access network can be connected to the multi-SIM/eSIM wireless device 302 at a time). The multi-SIM/eSIM wireless device 302 can use MOBIKE to change the transport of any existing tunneled connections to a tunneled IP cellular data connection via the second carrier wireless network 310B of the second (non-data-preferred) SIM/eSIM 406. For an existing VoLTE connection (other than the newly established voice connection for the non-data-preferred SIM/eSIM 406), the multi-SIM/eSIM wireless device 302 can perform a handover from VoLTE to Voice over IP Cellular Data (where the data transport will be the IP cellular data connection of the second, non-data-preferred SIM/eSIM 406). The multi-SIM/eSIM wireless device 302 can perform IMS SIP registration for the data-preferred SIM/eSIM 404 and other non-data-preferred SIMs/eSIMs via an IPSec tunneled connection through the IP cellular data connection of the second carrier wireless network 310B to their respective carrier wireless network's ePDGs.

Access to Services for Out-of-Service SIMs/eSIMs of a Multi-SIM/eSIM Wireless Device When a SIM/eSIM of a multi-SIM/eSIM wireless device 302 is out-of-service, e.g., due to being out of a wireless radio coverage area for the MNO associated with that SIM/eSIM, the multi-SIM/eSIM wireless device 302 can perform a SIP registration of an IMS server of the MNO's core network using a data connection, e.g., via a WLAN transport or via a cellular IP data transport. The multi-SIM/eSIM wireless device 302 can support a cellular IP data connection to a radio access network of a cellular wireless network of one of the SIMs/eSIMs at a time. In some embodiments, one of the SIMs/eSIMs of the multi-SIM/eSIM wireless device 302 is selected as a data-preferred SIM/eSIM. When the data-preferred SIM/eSIM is not out-of-service, the multi-SIM/eSIM wireless device 302 can maintain a cellular IP data connection using the data-preferred SIM/eSIM. When the data-preferred SIM/eSIM is out-of-service, the multi-SIM/eSIM wireless device 302 can select another SIM/eSIM that is in-service to act as a temporary data SIM/eSIM and establish a cellular IP data connection using the temporary data SM/eSIM. For any out-of-service SIMs/eSIMs, the multi-SIM/eSIM wireless device 302 can select a data transport, e.g., a WLAN data connection or the IP cellular data connection, and establish tunneled IP data connections for the out-of-service SIMs/eSIMs to the ePDGs of their respective cellular wireless networks to allow for access to services. Thus the "out-of-service" SIMs/eSIMs can have temporary access via a WLAN connection or via the SIM/eSIM with the cellular IP data connection. In some embodiments, the multi-SIM/eSIM wireless device 302 can select from available data transports based on various criteria, such as whether cellular data or WLAN data is preferred, or based on quality of a connection. The multi-SIM/eSIM wireless device 302 can use MOBIKE to change the transport of any existing tunneled connections to a tunneled IP cellular data connection via the selected transport (WLAN or IP cellular data). For an existing VoLTE connection, when handover from VoLTE to VoWLAN (when WLAN is the selected transport) or Voice over IP Cellular Data (when IP cellular data is the selected transport) is possible, a handover can be performed. The multi-SIM/eSIM wireless device 302 can perform an IMS SIP registration for the out-of-service SIMs/eSIMs via an IPSec tunneled connection through the IP cellular data connection of the in-service SIM/eSIM.

Representative Exemplary Embodiments

In some embodiments, a method to access services of multiple wireless networks by a wireless device includes the wireless device: i) detecting establishment of a voice connection via a radio access network (RAN) of a second wireless network using a non-data-preferred subscriber identity module (SIM) or electronic SIM (eSIM) of the wireless device; ii) responsive to the detecting the establishment of the voice connection: a) establishing a context for Internet Protocol (IP) network data connections via the non-data-preferred SIM or eSIM, b) establishing a tunneled packet data network (PDN) connection via the RAN of the second wireless network to a gateway of a first wireless network associated with a data-preferred SIM or eSIM of the wireless device, and c) registering for access to services of the first wireless network with a server of the first wireless network using the data-preferred SIM or eSIM via the tunneled PDN connection; and iii) responsive to detecting termination of the voice connection: d) terminating the context for IP network data connections via the non-data-preferred SIM or eSIM; and e) establishing a second context for IP network data connections via the data-preferred SIM or eSIM.

In some embodiments, the method further includes the wireless device, responsive to detecting termination of the voice connection, registering for access to services of the first wireless network with the server of the first wireless network using the data-preferred SIM or eSIM via a RAN of the first wireless network. In some embodiments, the method further includes the wireless device, prior to detecting establishment of the voice connection, registering for access to services of the first wireless network with the server of the first wireless network using the data-preferred SIM or eSIM via a RAN of the first wireless network. In some embodiments, registration for access to services of the first wireless with the server of the first wireless network is with an Internet Protocol Multimedia Subsystem (IMS) server. In some embodiments, the wireless device establishes the tunneled PDN connection via the RAN of the second wireless network only when a wireless local area network (WLAN) connection is not available. In some embodiments, the method further includes the wireless device, when a WLAN connection is available, establishing the tunneled PDN connection via the WLAN connection. In some embodiments, the method further includes the wireless device, after establishing the tunneled PDN connection, moving one or more existing IP network data connections for the data-preferred SIM or eSIM to the tunneled PDN connection via the second wireless network. In some embodiments, the method further includes the wireless device, responsive to detecting termination of the voice connection, moving the one or existing IP network data connections for the data-preferred SIM or eSIM to a PDN connection via the RAN of the first wireless network.

In some embodiments, a method to access services of multiple wireless networks by a wireless device includes the wireless device: i) detecting establishment of a voice connection via a radio access network (RAN) of a first wireless network using a data-preferred subscriber identity module (SIM) or electronic SIM (eSIM) of the wireless device; ii) responsive to the detecting the establishment of the voice connection: a) establishing a tunneled packet data network (PDN) connection via the RAN of the first wireless network to a gateway of a second wireless network associated with a non-data-preferred SIM or eSIM of the wireless device, and b) registering for access to services of the second wireless network with a server of the second wireless network using the non-data-preferred SIM or eSIM via the tunneled PDN connection; and iii) responsive to detecting termination of the voice connection, re-registering for access to services of the second wireless network with a server of the second wireless network using the non-data-preferred SIM or eSIM via a RAN of the second wireless network.

In some embodiments, the method further includes the wireless device, prior to detecting establishment of the voice connection, registering for access to services of the second wireless network with the server of the second wireless network using the non-data-preferred SIM or eSIM via the RAN of the second wireless network. In some embodiments, registration for access to services of the second wireless with the server of the second wireless network is with an Internet Protocol Multimedia Subsystem (IMS) server. In some embodiments, the wireless device establishes the tunneled PDN connection via the RAN of the first wireless network only when a wireless local area network (WLAN) connection is not available. In some embodiments, the method further includes the wireless device, when a WLAN connection is available, establishing the tunneled PDN connection via the WLAN connection.

In some embodiments, an apparatus includes one or more processors communicatively coupled to a memory storing instructions that, when executed by the one or more processors, cause the wireless device to access services of multiple wireless networks by performing a method that includes a set of actions as described hereinabove.

In some embodiments, a wireless device includes one or more antennas communicatively coupled to processing circuitry that includes one or more processors and a memory storing instructions that, when executed by the one or more processors, cause the wireless device to access services of multiple wireless network by performing a method that includes a set of actions as described hereinabove.

Representative Exemplary Apparatus

Figure 6:
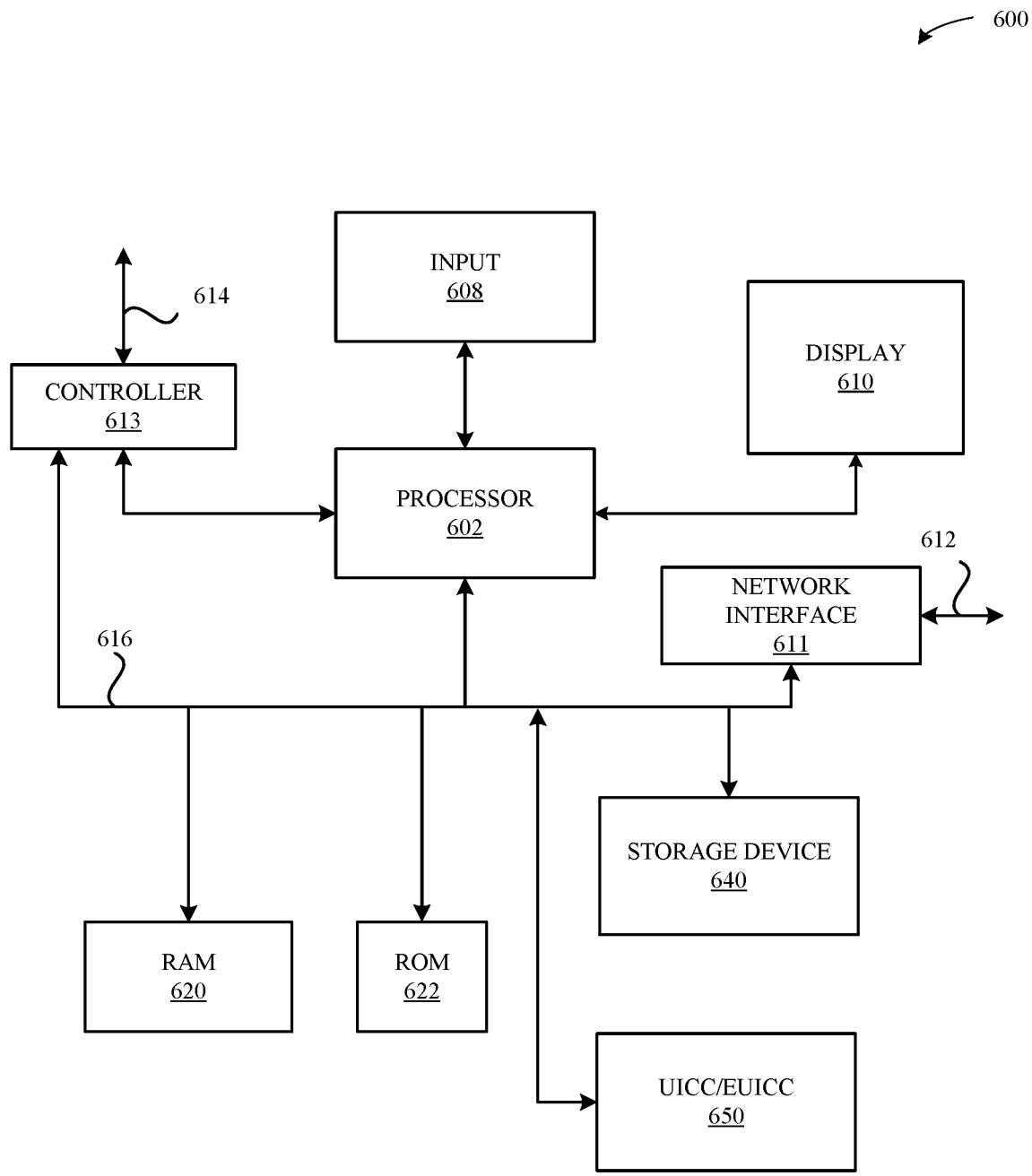
FIG. 6 an example set of components of a wireless device, in accordance with some embodiments.

FIG. 6 illustrates a detailed view of a computing device 600 that can be used to implement the various components described herein, according to some embodiments. In particular, the detailed view illustrates various components that can be included in the wireless devices illustrated in FIGS. 1-5 and/or described herein. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by the processor 602 to display information to the user. A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver. Otherwise, the multi-SIM/eSIM wireless device 302 can establish an IPSec tunnel an ePDG of the first carrier wireless network 310A and perform an IMS SIP registration for the first SIM/eSIM 404 through the tunneled connection. When the active voice connection for the non-data-preferred second SIM/eSIM 406 terminates, the multi-SIM/eSIM wireless device 302 can return to using an IMS SIP registration directly via the first carrier wireless network 310A. Additionally, data connectivity for the multi-SIM/eSIM wireless device 302 can be moved back to the data-preferred SIM/eSIM 404.

The computing device 600 also include a storage device 640, which can comprise a single disk or a plurality of disks (e.g., hard drives), and includes a storage management module that manages one or more partitions within the storage device 640. In some embodiments, storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600. The computing device 600 can further include one or more UICCs/eUICCs 650 that can store one or more SIMs and/or eSIMs.

Wireless Technology

In accordance with various embodiments described herein, the terms "wireless communication device," "wireless device," "mobile device," "mobile station," and "user equipment" (UE) may be used interchangeably herein to describe one, or any number of, common consumer electronic device(s) that may be capable of performing procedures associated various embodiments the disclosure. In accordance with various implementations, any one of these consumer electronic devices may relate to: a cellular phone or a smart phone, a tablet computer, a laptop computer or a netbook computer, a media player device, an electronic book device, a MiFi® device, a wearable computing device, as well as any other type of electronic computing device having fourth generation (4G) Long Term Evolution (LTE) and LTE Advanced (LTE-A), fifth generation (5G) new radio (NR), or similar "later generation" cellular wireless access communication capabilities.

Additionally, it should be understood that the UEs described herein may be configured as multi-mode wireless devices that are also capable of communicating via legacy third generation (3G) and/or second generation (2G) RATs in addition to communicating with 4G wireless networks, as well as communicating using one or more different wireless local area networks. Multi-mode UEs can include support for communication in accordance with one or more different wireless communication protocols developed by standards bodies, e.g., 3GPP's Global System for Mobile Communications (GSM), Universal Mobile Telecommunications System (UMTS), LTE, LTE-A, and 5G NR standards or 3GPP2's CDMA2000 (1×RTT, 2×EV-DO, HRPD, eHRPD) standards. Multi-mode UEs can also support communication using wireless local area networking protocols, e.g., the Institute of Electrical and Electronics Engineers (IEEE) 802.11 (Wi-Fi), IEEE 802.16 (WiMAX), and wireless personal area networking protocols, e.g., Bluetooth®. Multiple wireless communication protocols can provide complementary functions and/or different services for a multi-mode UE.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Further, some aspects of the described embodiments may be implemented by software, hardware, or by a combination of hardware and software. The described embodiments can also be embodied as computer program code stored on a non-transitory computer-readable medium. The computer readable-medium may be associated with any data storage device that can store data, which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method to access services of multiple wireless networks by a wireless device, the method comprising:
by the wireless device:
detecting establishment of a voice connection via a radio access network (RAN) of a second wireless network using a non-data-preferred subscriber identity module (SIM) or electronic SIM (eSIM) of the wireless device;
responsive to the detecting the establishment of the voice connection:
establishing a context for Internet Protocol (IP) network data connections via the non-data-preferred SIM or eSIM;
establishing a tunneled packet data network (PDN) connection via the RAN of the second wireless network to a gateway of a first wireless network associated with a data-preferred SIM or eSIM of the wireless device; and
registering for access to services of the first wireless network with a server of the first wireless network using the data-preferred SIM or eSIM via the tunneled PDN connection; and
responsive to detecting termination of the voice connection:
terminating the context for IP network data connections via the non-data-preferred SIM or eSIM; and
establishing a second context for IP network data connections via the data-preferred SIM or eSIM.

2. The method of claim 1, further comprising:
by the wireless device, responsive to detecting termination of the voice connection:
registering for access to services of the first wireless network with the server of the first wireless network using the data-preferred SIM or eSIM via a RAN of the first wireless network.

3. The method of claim 1, further comprising:
by the wireless device, prior to detecting establishment of the voice connection:
registering for access to services of the first wireless network with the server of the first wireless network using the data-preferred SIM or eSIM via a RAN of the first wireless network.

4. The method of claim 1, wherein registration for access to services of the first wireless network with the server of the first wireless network is with an Internet Protocol Multimedia Subsystem (IMS) server.

5. The method of claim 1, wherein the wireless device establishes the tunneled PDN connection via the RAN of the second wireless network only when a wireless local area network (WLAN) connection is not available.

6. The method of claim 5, further comprising:
by the wireless device, when the WLAN connection is available:
establishing the tunneled PDN connection via the WLAN connection.

7. The method of claim 1, further comprising:
by the wireless device, after establishing the tunneled PDN connection:
moving one or more existing IP network data connections for the data-preferred SIM or eSIM to the tunneled PDN connection via the second wireless network.

8. The method of claim 7, further comprising:
by the wireless device, responsive to detecting termination of the voice connection:
moving the one or existing IP network data connections for the data-preferred SIM or eSIM to a PDN connection via the RAN of the first wireless network.

9. A method to access services of multiple wireless networks by a wireless device, the method comprising:
by the wireless device:
detecting establishment of a voice connection via a radio access network (RAN) of a first wireless network using a data-preferred subscriber identity module (SIM) or electronic SIM (eSIM) of the wireless device;
responsive to the detecting the establishment of the voice connection:
establishing a tunneled packet data network (PDN) connection via the RAN of the first wireless network to a gateway of a second wireless network associated with a non-data-preferred SIM or eSIM of the wireless device; and
registering for access to services of the second wireless network with a server of the second wireless network using the non-data-preferred SIM or eSIM via the tunneled PDN connection; and
responsive to detecting termination of the voice connection:
re-registering for access to services of the second wireless network with a server of the second wireless network using the non-data-preferred SIM or eSIM via a RAN of the second wireless network.

10. The method of claim 9, further comprising:
by the wireless device, prior to detecting establishment of the voice connection:
registering for access to services of the second wireless network with the server of the second wireless network using the non-data-preferred SIM or eSIM via the RAN of the second wireless network.

11. The method of claim 9, wherein registration for access to services of the second wireless network with the server of the second wireless network is with an Internet Protocol Multimedia Subsystem (IMS) server.

12. The method of claim 9, wherein the wireless device establishes the tunneled PDN connection via the RAN of the first wireless network only when a wireless local area network (WLAN) connection is not available.

13. The method of claim 12, further comprising:
by the wireless device, when the WLAN connection is available:
establishing the tunneled PDN connection via the WLAN connection.

14. An apparatus configurable for operation in a wireless device, the apparatus comprising:
one or more processors communicatively coupled to a memory storing instructions that, when executed by the one or more processors, cause the wireless device to access services of multiple wireless networks by performing a set of actions including:
detecting establishment of a voice connection via a radio access network (RAN) of a second wireless network using a non-data-preferred subscriber identity module (SIM) or electronic SIM (eSIM) of the wireless device;
responsive to the detecting the establishment of the voice connection:
establishing a context for Internet Protocol (IP) network data connections via the non-data-preferred SIM or eSIM;
establishing a tunneled packet data network (PDN) connection via the RAN of the second wireless network to a gateway of a first wireless network associated with a data-preferred SIM or eSIM of the wireless device; and
registering for access to services of the first wireless network with a server of the first wireless network using the data-preferred SIM or eSIM via the tunneled PDN connection; and
responsive to detecting termination of the voice connection:
terminating the context for IP network data connections via the non-data-preferred SIM or eSIM; and
establishing a second context for IP network data connections via the data-preferred SIM or eSIM.

15. The apparatus of claim 14, the set of actions further comprising:
responsive to detecting termination of the voice connection:
registering for access to services of the first wireless network with the server of the first wireless network using the data-preferred SIM or eSIM via a RAN of the first wireless network.

16. The apparatus of claim 14, wherein registration for access to services of the first wireless network with the server of the first wireless network is with an Internet Protocol Multimedia Subsystem (IMS) server.

17. The apparatus of claim 14, wherein the wireless device establishes the tunneled PDN connection via the RAN of the second wireless network only when a wireless local area network (WLAN) connection is not available.

18. The apparatus of claim 17, the set of actions further comprising:
when the WLAN connection is available:
establishing the tunneled PDN connection via the WLAN connection.

19. The apparatus of claim 14, the set of actions further comprising:
after establishing the tunneled PDN connection:
moving one or more existing IP network data connections for the data-preferred SIM or eSIM to the tunneled PDN connection via the second wireless network.

20. The apparatus of claim 19, the set of actions further comprising:
responsive to detecting termination of the voice connection:
moving the one or existing IP network data connections for the data-preferred SIM or eSIM to a PDN connection via the RAN of the first wireless network.

* * * * *